United States Patent [19]

Sato

[11] 4,331,455
[45] May 25, 1982

[54] METHOD OF PRODUCING OXYGEN RICH GAS UTILIZING AN OXYGEN CONCENTRATOR HAVING GOOD START-UP CHARACTERISTICS

[75] Inventor: Toru Sato, Yonago, Japan
[73] Assignee: Osaka Oxygen Industries, Ltd., Osaka, Japan
[21] Appl. No.: 148,502
[22] Filed: May 9, 1980
[30] Foreign Application Priority Data
May 11, 1979 [JP] Japan .................. 54/58318
[51] Int. Cl.³ .................................. B01D 53/04
[52] U.S. Cl. .......................... 55/21; 55/31; 55/62; 55/75
[58] Field of Search .............. 55/18, 21, 31, 33, 62, 55/74, 75, 161, 162, 163, 179, 387, 389

[56] References Cited

U.S. PATENT DOCUMENTS

| | | | |
|---|---|---|---|
| 3,237,377 | 3/1966 | Skarstrom | 55/25 |
| 3,313,091 | 4/1967 | Berlin | 55/62 X |
| 3,533,221 | 10/1970 | Tamura | 55/33 |
| 3,719,025 | 3/1973 | Heinze et al. | 55/31 |
| 3,880,616 | 4/1975 | Myers et al. | 55/62 |
| 3,922,149 | 11/1975 | Ruder et al. | 55/21 |
| 3,957,463 | 5/1976 | Drissel et al. | 55/58 X |
| 4,013,429 | 3/1977 | Sircar et al. | 55/33 |
| 4,065,272 | 12/1977 | Armond | 55/25 |
| 4,153,434 | 5/1979 | Settlemyer | 55/163 |
| 4,165,972 | 8/1979 | Iles et al. | 55/162 X |
| 4,222,750 | 9/1980 | Gauthier et al. | 55/62 X |

Primary Examiner—Robert H. Spitzer
Attorney, Agent, or Firm—Frishauf, Holtz, Goodman & Woodward

[57] ABSTRACT

A method of producing oxygen rich gas utilizing an oxygen concentrator having a plurality of parallel-connected moisture/nitrogen removing units alternately operated to produce an oxygen-rich gas and connected through respective flow regulating valves to a common buffer tank for storing the gas thus produced. The flow regulating valves are operated so that, throughout substantially the second half of the operation cycle of each moisture/nitrogen removing unit, a portion of the gas having been processed by that unit is supplied to the other moisutre/nitrogen removing unit to restore its ability to remove the moisture and nitrogen and further so that, when the concentrator is to be stopped, a portion of the oxygen-rich gas stored in the buffer tank is caused to flow back into the one of the units having just finished a complete operation cycle to restore its ability to remove the moisture and nitrogen, thus providing immediate start-up of the units as well as immediate supply of oxygen-rich gas upon restarting the concentrator.

2 Claims, 3 Drawing Figures

METHOD OF PRODUCING OXYGEN RICH GAS UTILIZING AN OXYGEN CONCENTRATOR HAVING GOOD START-UP CHARACTERISTICS

BACKGROUND OF THE INVENTION

This invention relates to a method for producing an oxygen enriched gas utilizing a small-capacity oxygen concentrator mainly adapted for medical applications.

The recent years have seen an increase in the number of respiratory and circulatory patients and the advance of the inhalation therapy technique, and as a result, the demand for medical oxygen has been and will be on the uptrend. Conventionally, medical oxygen is generated in a large-size plant and transported to application sites in high-pressure containers. But this method of supply can be useless in a disaster or other emergencies and it presents difficulties in storage. It also involves hazards and regulations in handling high-pressure containers. What is more, the oxygen generator is of large size and is not intended for medical application so that unless it is operated continuously, oxygen is not generated immediately after its start-up.

Therefore, the primary object of this invention is to provide a method of producing an oxygen enriched gas utilizing a small-capacity oxygen concentrator that can be operated satisfactorily from a commercially available power supply and which can generate concentrated oxygen right after start-up.

Another object of this invention is to provide a method for producing an oxygen enriched gas utilizing an oxygen concentrator which is especially suitable for use in medical institutions, for houshold use, aboard vessels and aircraft.

SUMMARY OF THE INVENTION

In accordance with this invention, there is provided a method of operating an oxygen concentrator system comprising at least two parallel-connected units each consisting of a dehumidifier for absorbing the moisture in air supplied and an adsorber connected serially or integral with the dehumidifier for adsorbing the nitrogen content of the air, the units being operated alternately to produce an oxygen-rich gas, a buffer tank connected to the units through respective flow regulating valves, an oxygen supply control valve for controlling supply of the oxygen-rich gas from the buffer tank to the outside of the system of utilization thereof as by a patient, wherein the flow regulating valves are operated so that, throughout about the second half of the operation cycle of each unit, a portion of the gas having been processed by that unit is supplied to the other unit to restore its moisture-absorbing and nitrogen-adsorbing ability, and wherein, when the system is to be stopped, the operation of all the system components but the oxygen supply control valve is caused to continue until one of the units finishes a complete operation cycle and then a portion of the oxygen-rich gas stored in the buffer tank is caused to flow back into the unit having just finished the operation cycle to restore its moisture-absorbing and nitrogen-adsorbing ability, thus providing immediate start-up of the units as well as immediate supply of oxygen-rich gas upon restarting the system.

BRIEF DESCRIPTION OF THE DRAWINGS

Details of the invention will be readily understood after consideration of the following description and reference to the accompanying drawings, wherein.

DETAILED DESCRIPTION OF THE PREFERRED EMBODIMENTS

Figure 1:
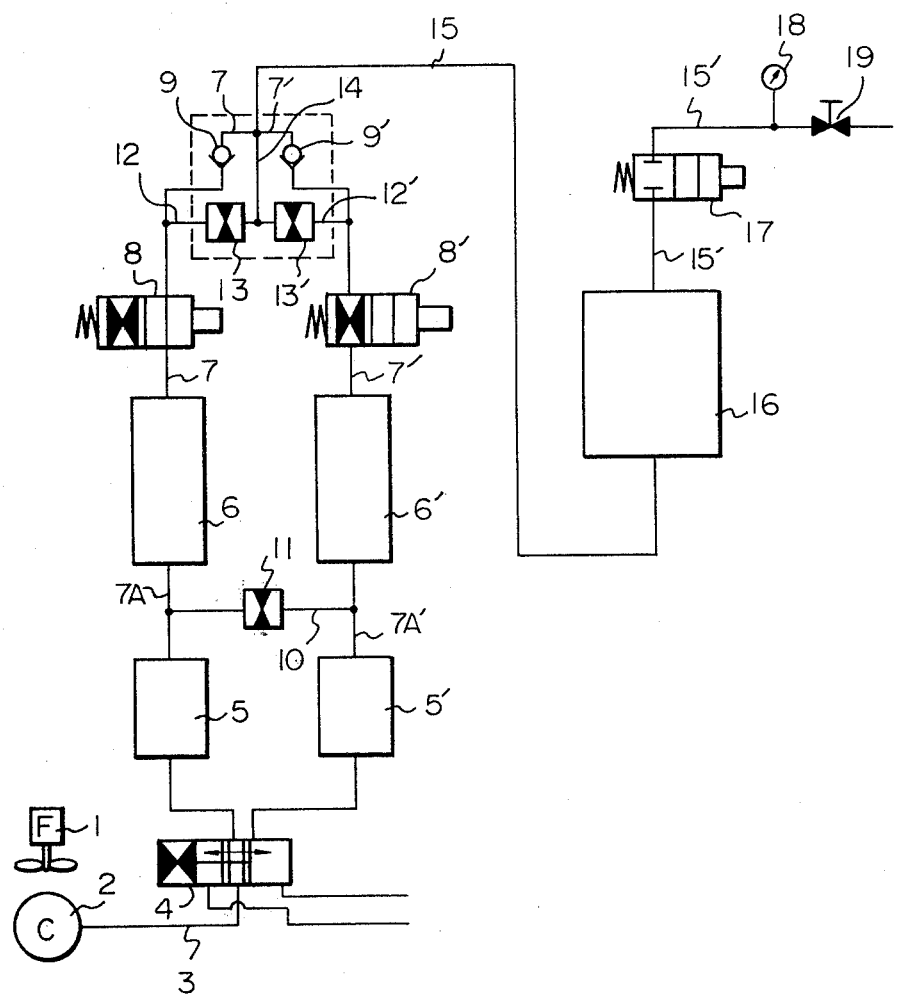
FIG. 1 is a block diagram of the oxygen concentrator system according to this invention.

First by reference to FIG. 1, a compressor 2 serving as an air supply source and which is to be cooled with a fan 1 is connected to an automatic direction switching valve 4 through a supply pipe 3. In one valve position, the compressor is connected to a moisture/nitrogen removing unit comprising a dehumidifier 5 equipped with means for absorbing the moisture of air supplied which is connected in series or integral with an adsorber 6 equipped with means for adsorbing the nitrogen in air. The terminal end of the moisture/nitrogen removing unit is connected through a conduit 7 to a solenoid valve 8, check valve 9, flow regulator 13, etc.

In the other valve position, the compressor is connected to another moisture/nitrogen removing unit comprising a dehumidifier 5' connected in series or integral with a nitrogen adsorber 6'. The terminal end of the moisture/nitrogen removing unit is connected through a conduit 7' to a solenoid valve 8', check valve 9', flow regulator 13', etc.

When humidifier-nitrogen adsorber connection is in series connection as shown in FIG. 1, the conduit 7A for connecting the dehumidifier 5 with the nitrogen adsorber 6 is connected by an intermediate pipe 10 to the conduit 7A' for connecting the dehumidifier 5' with the nitrogen adsorber 6'. A flow regulator 11 is disposed halfway the intermediate pipe 10. The conduit for connecting the solenoid valve 8 with the check valve 9 is likewise connected by branch pipes 12 and 12' to the conduit for connecting the solenoid valve 8' with the check valve 9'. Flow regulators 13 and 13' are connected to the branch pipes 12, 12', respectively. From the intermediate point of the pipe communicating the flow regulators, a pipe 14 extends and meets with the conduits 7, 7' coming from the check valves 9, 9'. The point where the three pipes join is connected to a buffer tank 16 through a conduit 15, and to a solenoid valve 17 for closing or opening the $O_2$ supply line, and to a flow regulator 19 through a conduit 15' which are connected with each other in series. A flow meter 18 is connected to the conduit 15'.

The nitrogen adsorber of the moisture/nitrogen removing unit is filled with an adsorbent having an adsorption capacity sufficient to provide oxygen-rich air. A suitable adsorbent includes but is not limited to zeolite.

The oxygen concentrator of this invention is constituted so that it retains compactness and quietness required for use in medical applications, that it is highly durable, and that it can supply a constant oxygen flow even when it is started to operate after a long shutdown period.

Figure 2:
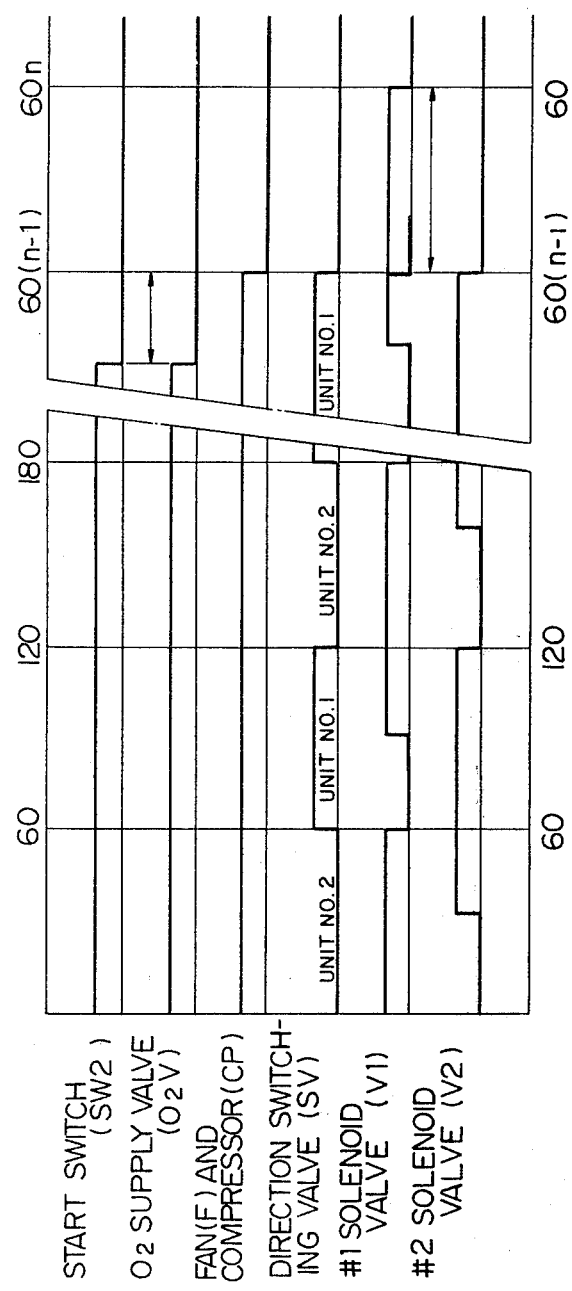
FIG. 2 is a time chart showing the sequence of operation of the main components of the concentrator system.
Figure 3:
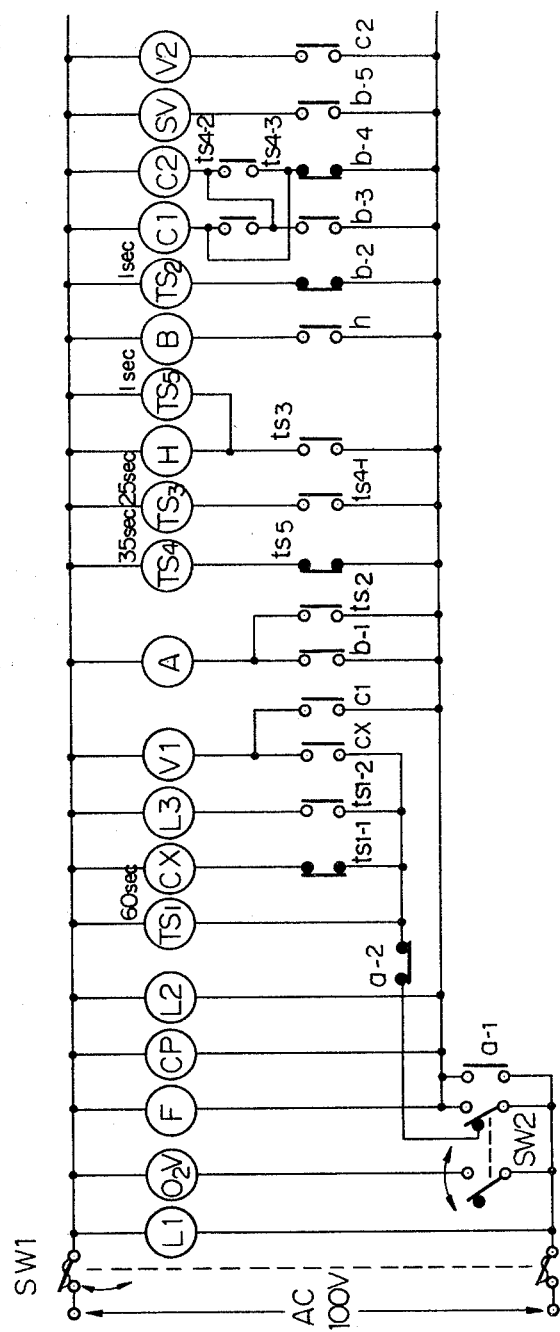
FIG. 3 is a schematic electrical diagram of the system.

FIG. 3 is a schematic electrical diagram of the system of FIG. 2, and FIG. 2 shows a time chart illustrating the operation of some of the components employed in the system.

In FIG. 3, the relay F is used to control the fan 1 so that the fan 1 is operated when the relay F is energized. The relay CP is used to control the compressor 2 so that the compressor 2 is operated when the relay CP is energized. The relay $O_2V$ is used to control the solenoid valve 17 so that the valve 17 can be opened only when the relay $O_2V$ is in its energized state.

In FIG. 3, "SV" designates a solenoid used to control the direction switching valve 4 shown in FIG. 1. More particularly, when the solenoid SV is in energized state, the valve 4 passes the air from the compressor 2 to the unit comprising the dehumidifier 5 and the adsorber 6 (which is referred to as "moisture/nitrogen removing unit No. 1"), while, on the other hand, when the solenoid SV is in deenergized state, the valve 4 passes the air from the compressor 2 to the unit comprising the dehumidifier 5' and the adsorber 6' (which is referred to as "moisture/nitrogen removing unit No. 2"). "V1" designates a solenoid corresponding to the solenoid valve 8 shown in FIG. 1 (this is referred to as "solenoid valve No. 1") while "V2" designates a solenoid corresponding to the solenoid valve 8' shown in FIG. 1 (this can be referred to as "solenoid valve No. 2"). The relay C1 is used to control the solenoid V1 through its normally open contact C1 while the relay C2 is used to control the solenoid V2 through its normally open contact C2.

When the power switch SW1 has been turned on, this state of the switch SW1 is indicated by the lighting of the lamp L1.

When the start switch SW2, which is an on-off switch which is turned on when the system of FIG. 1 is to be started and thereafter turned off when the system is to be turned off, is turned on (switched to its right position as viewed in FIG. 3) as indicated by the lighting of the lamp L2, the relays F and CP are energized and voltage is applied across the upper and lower power lines between which the lamp L2 is connected. Therefore, voltage is applied to the timer TS4 from the power lines through the normally closed contact ts5 of the timer TS5.

In this condition, the solenoid SV is in a deenergized state, so that the value 4 of FIG. 1 introduces the air from the compressor 2 into the moisture/nitrogen removing unit No. 2 where the air is dehumidified and subjected to the nitrogen removing operation. The pressure of the oxygen-rich gas thus obtained in the adsorber 6' gradually increases with time. The application of the voltage across the power lines causes the relay C1 to be energized by means of the normally closed contact b-4 of the relay B so that the solenoid V1 is energized by means of the contact c1 of the relay C1 to open the valve 8. In this condition, the adsorber 6 is in aircommunication with the buffer tank 16 so that, if the pressure within the adsorber 6 is higher than the pressure within the buffer tank 16, the adsorber 6 supplies air to the buffer tank 16, and if the pressure within the adsorber 6 is lower than the pressure within the buffer tank 16, the buffer tank 16 supplies air to the adsorber 6 to slightly restore the nitrogen removing ability of the adsorber 6.

About 35 seconds after the energization of the relay C1, the timer TS4 is actuated to close its normally open contact ts4-1, ts4-2 and ts4-3. The closure of the contact ts4-3 causes the relay C2 to be energized, and as a result the solenoid V2 is energized by means of the contact c2 of the relay C2. Therefore, the gas under pressure which has been processed by the moisture/nitrogen removing unit No. 1 is supplied not only to the buffer tank 16, but also to the adsorber 6 to restore its nitrogen removing ability. The flow regulator 11 may be operated in synchronism with the operation of the solenoid valves 8 and 8' so that the restoration of the nitrogen removing ability of the adsorber 6 is effected simultaneously with the restoration of the moisture removing ability of the dehumidifier 5, and the restoration of the nitrogen removing ability of the adsorber 6' is effected simultaneously with the restoration of the moisture removing ability of the dehumidifier 5'. The closure of the contact ts4-1 causes voltage to be applied to the timer TS3. In this case, however, the closure of the contact ts4-2 has no effect on the relay C1 because the relay C1 has already been energized.

About 25 seconds after the closure of the contact ts4-1, the timer TS3 is actuated to close its normally open contact ts3 to thereby switch on the ratchet timer H and the timer TS5.

The ratchet timer H is alternately switched on and off each time the contact ts3 is closed.

One second after the closure of the contact ts3, the timer TS5 is actuated to open its normally closed contact ts5. The opening of the contact ts5 causes the timer TS4 to be switched off which in turn switches off the timer TS3. The switching-off of the timer TS3 causes the timer TS5 to be switched off by opening the contact ts3.

The closure of the contact ts5 causes voltage to be reapplied to the timer TS4, which then resumes counting 35 seconds. Thus, the timer TS3 is actuated every 60 seconds that corresponds to the 35 seconds counted by the timer TS4 plus the 25 seconds counted by the timer TS3.

Furthermore, when the contact ts3 is closed as noted hereinbefore, the ratchet timer H is switched from one state thereof (this state is referred to as the "inoperative state") to the other state thereof (this state is referred to as the "operative state"). When the ratchet timer H is switched from one state thereof to the other state thereof to close its normally open contact h, the relay B is energized. When the relay B is energized, the contact b-3 is closed and at the same time the contact b-4 is opened.

The contacts b-3 and b-4 are used to change the effect of the operation of the timer TS4 on the relays C1 and C2. That is, when the timer TS4 is operated under the condition that the contact b-3 is in the open state and the contact b-4 is in the closed state, the relay C1 is maintained energized for 60 seconds and the relay C2 is kept closed for 25 seconds, while, on the other hand, when the timer TS4 is operated under the condition that the contact b-3 is in the closed state and the contact b-4 is in the open state, the relay C2 is maintained energized for 60 seconds and the relay C1 is maintained energized for 25 seconds.

The normally open contact b-5 of the relay B controls the solenoid SV which in turn controls the direction switching valve 4 in the manner noted hereinbefore.

Thus, in the second operation cycle, the valve 4 of FIG. 1 introduces the air from the compressor 2 into the moisture/nitrogen removing unit No. 1 wherein the air is dehumidified and subjected to the nitrogen removing operation. The pressure of the oxygen-rich gas thus obtained in the adsorber 6 gradually increases with time.

About 35 seconds after the reapplication of the voltage to the timer TS4, the timer TS4 is actuated again. The gas under pressure which has been processed by the moisture/nitrogen removing unit No. 1 is supplied not only to the buffer tank 16 but also to the adsorber 6' to restore its nitrogen removing ability, in the same manner as noted with respect to the first operation cycle of the moisture/nitrogen removing unit No. 2.

The relay A, which is controlled by the normally open contact b-1 of the relay B and the normally open contact ts2 of the timer TS2 acts as an operation hold relay, as will become apparent hereinafter. It is sufficient to note only that so long as the switch SW2 is kept in its "on" state (switched to its right position as viewed in FIG. 3), the power lines between which the lamp L3 is connected are supplied with voltage by means of the movable contact thereof shown to the righthand in FIG. 3.

The moisture/nitrogen removing unit No. 2 and the moisture/nitrogen removing unit No. 1 are operated so that the first and second operation cycles are alternated, in said first operation cycle, one of said units supplies, during approximately (about) the second half of the operation cycle, the gas processed therein not only to said buffer tank but also to the other unit to restore the moisture/nitrogen removing ability of the other unit. In said second operation cycle, said other unit supplies, during approximately the second half of the operation cycle, the gas processed therein not only to said buffer tank but also to said one unit to restore the moisture/nitrogen removing ability of said one unit.

When the switch SW2 is turned off (switched to its left position as viewed in FIG. 3), it deenergizes the solenoid $O_2V$. However, voltage is continued to be applied across the power lines between which the lamp L2 is connected even after turning off the switch SW2, because the relay A is maintained energized to keep its contact a-1 closed. The relay A can be deenergized only when the relay B is switched from its energized state to its deenergized state to close the contact b-2. The timer TS2 is actuated one second after closure of the contact b-2. The deenergization of the relay B occurs when the ratchet timer H is changed from its operative state to its inoperative state, or in other words, when the solenoid SV is changed from its state in which it causes the direction switching valve 4 to introduce air into the unit No. 1 to its another state in which it causes the direction switching valve 4 to introduce air into the unit No. 2.

The operation of all the system components connected between the power lines is maintained so that the moisture/nitrogen removing unit No. 1 can complete the operation cycle during which it supplies the gas processed therein to the moisture/nitrogen removing unit No. 2 to restore the moisture/nitrogen removing ability of the unit No. 2.

When relay A is deenergized, the voltage applied across the power lines is removed to stop the operation of all the components connected between the power lines. Furthermore, when the relay A is deenergized, the contact a-2 of the relay A is closed to apply voltage across the timer TS1. The timer TS1 is arranged so that it keeps the relay CX energized for only 60 seconds to thereby keep the solenoid V1 open for that period, during which oxygen-rich gas stored in the buffer tank 16 is caused to flow back into the adsorber 6 to restore its nitrogen removing ability. 60 seconds after the deenergization of the relay A, the timer TS1 is turned off to deenergize the solenoid V1.

The operation of the components of major importance depicted in the schematic diagram of FIG. 3 is graphically illustrated in FIG. 2.

By reference to FIG. 3, a power switch SW1 is closed to turn power (100 volts A.C.) on. By placing a start switch SW2 in the position opposite the one shown in FIG. 3, the operation of the concentrator system starts. The compressor 2 (CP) and cooling fan 1 (F) now start to rotate to supply air to the direction switching valve 4. The solenoid valve 8 (V1) (hereunder referred to as a solenoid valve No. 1) is opened because a relay C1 for opening the valve 8 is closed. The air is passed through the dehumidifier 5 and nitrogen adsorber 6 (the combination of the components 5 and 6 hereunder referred to as a moisture/nitrogen removing unit No. 1) and the oxygen-rich gas obtained is sent through the solenoid valve 8 (V1), the check valve 9 and flow regulator 13 to the buffer tank 16 where it is stored under pressure. Upon starting the operation, the solenoid valve 17 ($O_2V$) is opened to permit the supply of oxygen for utilization as by the patient. A portion of the oxygen supply is sent through the flow regulator 11 to the dehumidifier 5' of another pair of dehumidifier 5' and nitrogen adsorber 6' (hereunder referred to as a moisture/nitrogen removing unit No. 2) to thereby restore its ability to absorb the moisture. About 35 seconds after the start of the operation, a timer TS4 is actuated and its normally open contact TS4-3 is closed to energize a relay C2 for opening the solenoid valve 8' (V2) (hereunder referred to as a solenoid valve No. 2). A greater amount of oxygen-rich gas is then caused to flow into the moisture/nitrogen removing unit No. 2 through the flow regulators 13', thus restoring completely the moisture-absorbing and nitrogen-adsorbing ability of the moisture/nitrogen removing unit No. 2.

About 25 seconds after the actuation of the timer TS4, a timer TS3 is actuated to close its normally open contact ts3, whereupon a ratchet timer H (becoming operative and inoperative alternately upon each supply of a signal, or upon each closing of the normally opening contact ts3) becomes operative to energize a relay B. The energization of the relay B causes the solenoid valve No. 1 to be closed so that the moisture/nitrogen removing unit No. 1 finishes its first complete operation cycle of 60 seconds. Furthermore, by means of its normally closed contact b-5, the relay B switches the direction switching valve 4 (SV) to permit the air to be supplied to the moisture/nitrogen removing unit No. 2. The circuit portion of FIG. 3 comprising the ratchet timer H, a timer TS5 adapted to be kept actuated for only one second upon each actuation of the timer TS3, and the contact ts3 illustrates only schematically the operation of the timers H and TS5 under the control of the timer TS3, and it is to be understood that that circuit portion is not meant to represent a physical circuit configuration. The moisture/nitrogen removing unit No. 2 now takes the turn to generate an oxygen-rich gas. In the same manner as described in connection with the generation of such gas in the moisture/nitrogen removing unit No. 1, the solenoid valve No. 1 is opened about 35 seconds after the closing thereof, through the actuation of the timer TS4. A portion of the resulting oxygen-rich gas is passed through the flow regulators 13 and the solenoid valve No. 1 into the moisture/nitrogen removing unit No. 1 for the complete restoration of its ability to remove the moisture and nitrogen. The function of the dehumidifiers 5, 5' can be effectively regenerated by supplying dry air, whereas the function of the nitrogen adsorbers 6, 6' by supplying an oxygen-rich gas. About 25 seconds after the actuation of the timer TS4, the timer TS3 is actuated to switch the state of the ratchet timer H thereby to cause the solenoid valve No. 28' to be closed so that the moisture/nitrogen removing unit No. 2 finishes its first complete operation cycle of 60 seconds. Thereafter, the following operation cycles of each of the moisture/nitrogen removing units No. 1 and No. 2 take place in a similar manner. Thus, the moisture/nitrogen removing units No. 1 and No. 2 operate alternately, and during the specified portion of the operating cycle of one unit, the regeneration of the function of the other unit is carried out to thereby generate a constant flow of oxygen. In accordance with the invention, the system does not stop its operation right after the start switch SW2 is placed in the position shown in FIG. 3, and instead, it completes the following operation before it stops: when the start switch SW2 is placed in the position shown in FIG. 3, the solenoid valve 17 (O₂V) is closed to let the oxygen-rich gas not escape from the buffer tank 16, but an operation hold relay (A) which is kept operative whenever the moisture/nitrogen removing unit No. 1 or No. 2 is operated is self-held in ON position by means of its normally closed contact a-1 to proceed with the programmed sequence of operation of the fan 1, compressor 2 and the other system components until the moisture/nitrogen removing unit No. 1 terminates an additional adsorption step. To be more specific, when the direction switching valve 4 (SV) is switched for the moisture/nitrogen removing unit No. 2, the hold relay (A) that has been self-held is rendered OFF because the timer TS2 is turned off for about one second to terminate the programmed sequence of operation of the fan 1, compressor 2 and the other system components excluding solenoid valve No. 1. The circuit portion of FIG. 3 comprising the timer TS2 and the contact b-2 illustrates only schematically the operation of the timer TS2 under the control of the relay B, and it is to be understood that that circuit portion is not meant to a physical circuit configuration. When the hold relay (A) is rendered OFF, the normally closed contact a-2 of the hold relay (A) holds the timer TS1 ON for 60 seconds, whereby a relay CX and a stop cycle indication lamp L3 are kept energized and the solenoid valve No. 1 that is operated by the relay CX is kept open for 60 seconds while the oxygen-rich gas stored in the buffer tank 16 is caused to flow back through the flow regulator 13 into the moisture/nitrogen removing unit No. 1 so that it is subjected to an additional adsorption step i.e., the timer TS1 is arranged to keep its contact ts-1 in such a position so as to energize the relay CX, for 60 seconds. In this way, the function of both the moisture/nitrogen removing units No. 1 and No. 2 has been regenerated before all system components terminate their operation. In addition, the buffer tank 16 contains oxygen-rich gas under pressure. Therefore, upon restarting of the system, each moisture/nitrogen removing unit is ready for performing its function satisfactorily for supplying the oxygen-rich gas from the buffer tank 16 to the outside of the system for utilization as by the patient.

In summary, instead of making an effort to increase the yield of an oxygen concentrator in continuous operation mode, this invention provides a small-size, low-cost oxygen concentrator that achieves short start-up time which has been particularly required in clinical applications.

It is to be understood that various changes or modifications may be made by those skilled in the art without departing from the spirit of the invention, and that therefore all matter shown and described is to be interpreted as illustrative and not in a limiting sense.

What is claimed is:

1. A method of operating an oxygen-rich gas generating system so that it can generate an oxygen-rich gas immediately upon restarting even after the system has been stopped for a long period of time, said system including two parallel-connected moisture/nitrogen removing units comprising a first unit and a second unit, a compressor for supplying air to said units, a buffer tank for storing the gas processed by said unit, and an on-off switch which is turned on when the system is to be started and thereafter turned off when the system is to be stopped, said method comprising the steps of:
    (a) starting said system by turning on said on-off switch;
    (b) operating said units so that first and second operation cycles are alternated, in said first operation cycle, the first of said units supplies, during about the second half of the operation cycle, the oxygen-rich gas processed therein to said buffer tank and also to said second unit to restore the moisture/nitrogen removing ability of said second unit, and in said second operation cycle, said second unit supplies, during about the second half of the operation cycle, the oxygen-rich gas processed therein to said buffer tank and also to said first unit to restore the moisture/nitrogen removing ability of said one unit;
    (c) maintaining the operation of said units even after turning-off of said switch so that the one of said units then producing oxygen-rich gas will complete the operation cycle during which it supplies a part of the oxygen-rich gas processed therein to the other unit to restore the moisture/nitrogen removing ability of the other unit;
    (d) stopping said other unit when said one unit has completed said operation cycle during which the moisture/nitrogen removing ability of said other unit is restored;
    (e) causing the gas stored in said buffer tank to flow back into the unit which was producing oxygen-rich gas when the on-off switch was turned off and which has now completed said operation cycle, for a period of time sufficient to restore the moisture/nitrogen removing ability of said unit; and
    (f) stopping said one unit and thereafter keeping all the system components in their respective conditions as of the completion of step (e), whereby they are ready for restarting for immediate production of oxygen-rich gas.

2. The method according to claim 1 wherein one operation cycle of each of said units has a period of time of about 60 seconds, and the period of time during which each of said units is supplied with the gas processed by the other unit to restore its moisture/nitrogen removing ability is about 25 seconds.

* * * * *